United States Patent [19]

Lacroix et al.

[11] 4,098,569
[45] Jul. 4, 1978

[54] STABLE CONCENTRATED LIQUID PREPARATION OF PAPER DYES OF THE DISAZO CLASS

[75] Inventors: Roger Lacroix, Huningue, France; Roland Häberli, Würenlingen, Switzerland

[73] Assignee: Ciba-Geigy Corporation, Ardsley, N.Y.

[21] Appl. No.: 701,435

[22] Filed: Jun. 30, 1976

[30] Foreign Application Priority Data

Jul. 3, 1975 [CH] Switzerland .................. 8675/75

[51] Int. Cl.² .................. C09B 27/00; C09B 67/00
[52] U.S. Cl. .................. 8/41 R; 8/7; 8/82; 8/93; 260/175
[58] Field of Search .................. 8/41 R, 93

[56] References Cited

U.S. PATENT DOCUMENTS

| 3,989,452 | 11/1976 | Hugelshofer | 8/42 R |
| 3,995,997 | 12/1976 | Boehmke et al. | 8/84 |

FOREIGN PATENT DOCUMENTS

| 1,551,772 | 12/1968 | France. |
| 1,453,046 | 10/1976 | United Kingdom. |

OTHER PUBLICATIONS

Color Index (Third Edition), 1971, vol. 4, pp. 4267 & 4271–4273.

Primary Examiner—A. Lionel Clingman
Attorney, Agent, or Firm—Edward McC. Roberts; Michael W. Glynn; Prabodh I. Almaula

[57] ABSTRACT

There is described a stable concentrated liquid preparation of paper dyes which preparation contains 15 to 40 per cent by weight of certain anionic disazo dyes of the formula

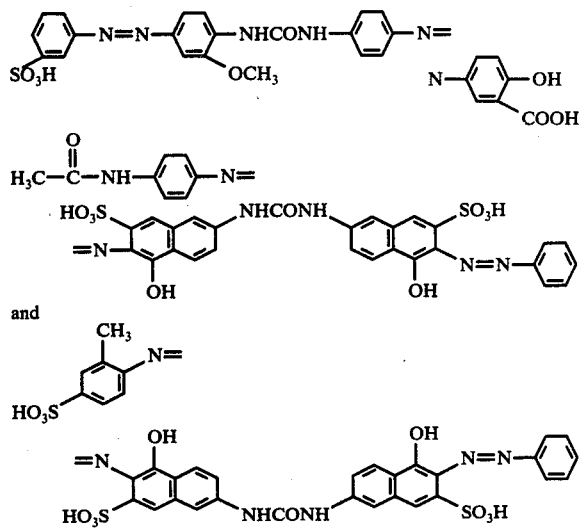

and dissolved in 40 to 80 per cent by weight of a diethylene glycol monoalkyl ether, optionally in admixture with up to 30 per cent by weight of a mono-, di-, tri- or tetraalkylene glycol, and the use of this liquid preparation for the dyeing and printing of paper, semi-cardboard and cardboard.

6 Claims, No Drawings

STABLE CONCENTRATED LIQUID PREPARATION OF PAPER DYES OF THE DISAZO CLASS

The invention relates to a stable concentrated liquid preparation of paper dyes of the disazo class, to processes for producing it, and to its use for the dyeing of, in particular, paper.

Liquid preparations of acid dyes, inter alia of paper dyes, are known, for example, from DOS No. 2,152,523 and from DAS No. 2,115,877. These use as one of the solvents, inter alia, triethanolamine. Since this on the one hand is commercially difficult to obtain and on the other hand is biologically not easy to decompose, and since moreover such liquid preparations have a storage stability that is not too good, efforts have been made to replace triethanolamine with something which does not have the said disadvantages and which, in addition, does not adversely affect the hitherto good coloristic properties of such liquid preparations.

A liquid preparation has now been found which does not contain triethanolamine, which is consequently more economical, which contaminates the waste-liquors less and which surprisingly combines within itself all the desired properties.

The liquid preparation according to the invention contains 15 to 40 percent by weight of a dye of the formula

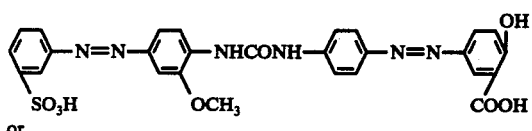

or

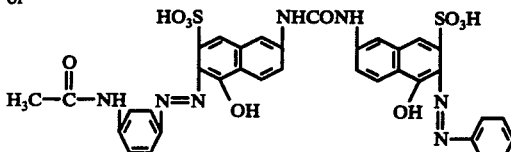

or

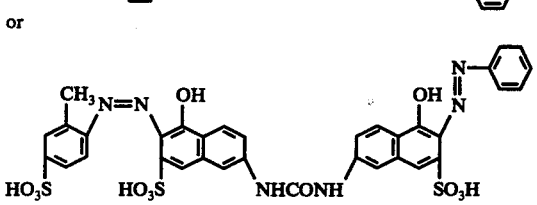

optionally in the form of an alkali salt, especially the sodium salt, dissolved in 40 to 80 percent by weight of a diethylene glycol monoalkyl ether, optionally in admixture with 0.1 to 30 percent by weight of a mono-, di-, tri- or tetraalkylene glycol.

This new liquid preparation constitutes a true solution. It has a high dye concentration; it is thinly liquid; it has a viscosity of about 150 to 250 cPs/20° C; it is stable in storage throughout several months at temperatures of between about −20° C and +50° C; it is soluble in cold water and warm water in any proportion; and it may be considered as being toxicologically safe.

Particularly interesting liquid preparations contain a mixture of two glycols, namely of a diethylene glycol monoalkyl ether with a mono-, di-, tri- or tetraalkylene glycol. In such a mixture, the amount of diethylene glycol monoalkyl ether is reduced compared with the amount present in a liquid preparation containing only a diethylene glycol monoalkyl ether.

The "alkyl" moiety in the diethylene glycol monoalkyl ether and in the mono-, di-, tri- and tetraalkylene glycol preferably contains 1 to 4 carbon atoms. Particularly preferred compounds are diethylene glycol monomethyl ether and diethylene glycol monoethyl ether, as well as triethylene glycol.

Preferred formulations contain 40 to 75 percent by weight of a diethylene glycol monoalkyl ether and 15 to 25 percent by weight of a mono-, di-, tri- or tetraalkylene glycol as well as 25 to 40 percent by weight of a disazo paper dye as defined.

This liquid preparation is produced, for example, by a process wherein the disazo dye as pure material (e.g. as sodium salt) is stirred at a temperature of, in particular, 15° to 60° C into the diethylene glycol monoalkyl ether, optionally in admixture with the mono-, di-, tri- or tetraalkylene glycol, until a solution is obtained, and this is subsequently filtered, optionally with the addition of a filtering auxiliary, e.g. through a polyamide filter.

The liquid preparations according to the invention are used, optionally after dilution with water, particularly for the dyeing and printing of paper, semi-cardboard and cardboard, whereby these materials can be dyed, for example, in the pulp, by brushing or by immersion.

Furthermore, liquid preparations of this kind can also be used for a continuous or discontinuous dyeing process for textile materials.

The following Examples illustrate the invention. In these Examples, "g" denotes gram, "SR" is an abbreviation for "Schopper Riegler", temperatures are given in degrees Centigrade and, except where otherwise stated, % values are expressed as percent by weight.

EXAMPLE 1

720 g of diethylene glycol monoethyl ether is placed into a 1500 ml beaker; there is then added at room temperature, with stirring, 280 g of the crude dye of the formula

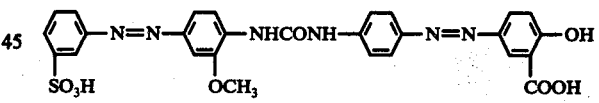

as neutral sodium salt.

Stirring is maintained for 1 hour, and there is subsequently added 20 g of a filtering auxiliary (Hyflo, John Manville). Filtration is performed to obtain a dye solution consisting of 28% by weight of the above dye and 72% by weight of diethylene glycol monoethyl ether.

This dye solution has a viscosity of 250 cps/20° and, after dilution with water, is used for dyeing paper.

EXAMPLE 2

500 g of diethylene glycol monomethyl ether is mixed with 220 g of triethylene glycol at room temperature in a 1500 ml beaker. There is then added portionwise to this mixture, with vigorous stirring, 280 g of the crude dye according to Example 1, whereupon there results a solution which, after completion of the addition of dye, is stirred for a further 1½ hours at room temperature. There is advantageously added to this solution also 20 g of a filtering auxiliary (e.g. Hyflo), and the solution is subsequently filtered to remove, in particular, the salt mixed with the dye. There is obtained a dye solution consisting of 28 percent by weight of the above-mentioned dye, 22 percent by weight of triethylene glycol and 50 percent by weight of diethylene glycol monomethyl ether, which solution is stable and, by virtue of good miscibility in any proportion with water, very well suited for the dyeing of paper.

EXAMPLE 3

250 g of the dry salt-containing dye of the formula

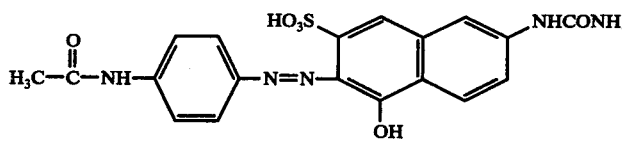

is dissolved, by stirring, in a mixture of 500 g of diethylene glycol monomethyl ether and 250 g of triethylene glycol at a temperature of about 50° to 60°. Stirring is continued for 1 hour and an addition is made of 20 g of a filtering auxiliary (Hyflo). Filtration is then performed to obtain a dye solution consisting of 25 percent by weight of the above dye, 50 percent by weight of diethylene glycol monomethyl ether and 25 percent by weight of triethylene glycol, which solution is stable and, by virtue of good miscibility with water in any proportion, very suitable for the dyeing of paper.

EXAMPLE 4

If the procedure is carried out in an analogous manner to that of Example 3 except that there is used 360 g of the dry salt-containing dye of the formula

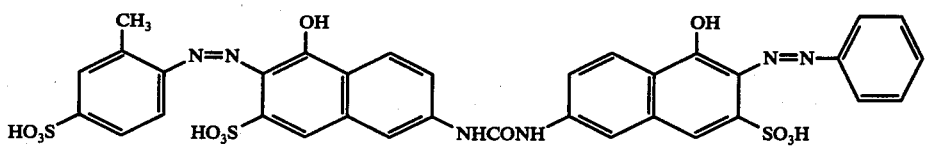

instead of the dye given in that Example, as well as 440 g of diethylene glycol monomethyl ether and 200 g of triethylene glycol instead of the 500 g of diethylene glycol monomethyl ether and 250 g of triethylene glycol, then there is obtained a dye solution consisting of 36 percent by weight of the above dye, 20 percent by weight of triethylene glycol and 44 percent by weight of diethylene glycol monomethyl ether, which solution is very suitable for dyeing paper.

EXAMPLE 5

Printing Paper 800 kg of bleached sulphate cellulose and 200 kg of bleached sulphite cellulose in the as supplied condition are placed into a pulper containing 14 cubic meters of industrial water, and beaten up until free from specks. The beating up operation requires 30 minutes. The beaten-up cellulose is then transferred to a discharge vat. From this vat the cellulose suspension is ground by means of pulp mills to a degree of fineness of 25° SR, and is subsequently fed into a mixing vat. There is then added to the pulp in the mixing vat 250 kg of kaolin Ia (as filler), as well as 0.1 to 0.05% of the dye formulation according to Example 1, based on the weight of absolutely dry fibre. After 15 minutes' absorption time, there are added 2% of resin glue, based on the weight of absolutely dry cellulose and, after 10 minutes, 4% of alum, based on the weight of absolutely dry cellulose. In the normal course of the process, this paper pulp is then fed to the paper machine and from this is obtained a printing paper dyed in a yellow shade.

EXAMPLE 6

Tissue Paper 1000 kg of bleached sulphate cellulose in the as supplied condition is placed into a pulper containing 14 cubic meters of industrial water, and beaten up until free from specks, an operation requiring 30 minutes. The beaten-up cellulose is subsequently transferred to a discharge vat, and from this vat it is ground by means of pulp mills to degree of fineness of 25° SR; the cellulose is then fed into a mixing vat. An addition is made in the mixing vat of 0.1 to 0.05% of the dye formulation according to Example 1, relative to the weight of absolutely dry fibre. After 15 minutes' absorption time, this paper pulp passes in the normal course of the process to the paper machine, from which emerges a tissue paper dyed in a yellow shade.

EXAMPLE 7

Sizing Press Application 5 kg of dye in the form of a solvent-containing formulation according to Example 1 is dissolved in 1000 liters of a 10% aqueous anionic starch solution (soluble starch which is oxidatively hydrolysed), and the solution is applied by way of a sizing press to a paper web. The applied amount of the above solution is 1.5 g/m² of absolutely dry paper per side. There is obtained a paper dyed in a yellow shade.

We claim:

1. A stable concentrated liquid preparation of paper dyes of the disazo class, which preparation consists essentially of 15 to 40 percent by weight of a dye of the formula

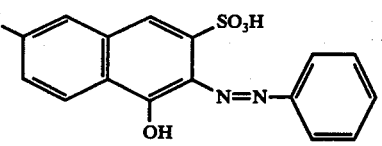

or

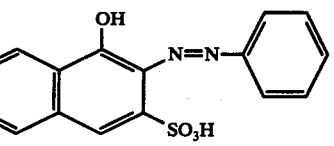

or

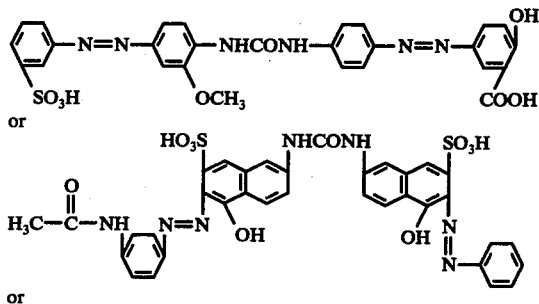

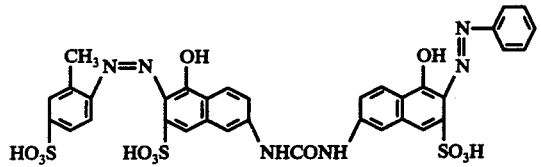

or the alkali salt thereof, dissolved in 40 to 80 percent by weight of diethylene glycol $C_1$–$C_4$-monoalkyl ether, alone or in admixture with up to 30 percent by weight of mono-, di-, tri- or tetra-$C_1$–$C_4$-alkylene glycol.

2. A stable preparation according to claim 1, wherein the preparation contains a mixture of the diethylene glycol monoalkyl ether with the mono-, di-, tri-, or tetraalkylene glycol.

3. A stable liquid preparation according to claim 2, wherein the preparation contains 40 to 75 percent by weight of the diethylene glycol monoalkyl ether and 15 to 25 percent by weight of the mono-, di-, tri-, or tetraalkylene glycol.

4. A stable liquid preparation according to claim 1, wherein the preparation contains 25 to 40 percent by weight of said dye.

5. A stable liquid preparation according to claim 1, wherein the diethylene glycol monoalkyl ether is diethylene glycol monomethyl ether or diethylene glycol monoethyl ether, and the glycol is triethylene glycol.

6. A stable preparation according to claim 1, wherein the dye is in the form of the sodium salt thereof.

* * * * *